United States Patent
Subburaj et al.

(10) Patent No.: US 12,436,255 B2
(45) Date of Patent: Oct. 7, 2025

(54) NON-UNIFORM MULTI-DIMENSIONAL DATA ACCESS FOR RADAR DATA PROCESSING

(71) Applicant: TEXAS INSTRUMENTS INCORPORATED, Dallas, TX (US)

(72) Inventors: Karthik Subburaj, Bangalore (IN); Karthik Ramasubramanian, Bangalore (IN); Shailesh Joshi, Bangalore (IN); Kameswaran Vengattaramane, Bangalore (IN); Indu Prathapan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/654,683

(22) Filed: May 3, 2024

(65) Prior Publication Data

US 2024/0288563 A1    Aug. 29, 2024

Related U.S. Application Data

(63) Continuation of application No. 17/351,654, filed on Jun. 18, 2021, now Pat. No. 12,007,462.

(30) Foreign Application Priority Data

Oct. 16, 2020    (IN) .............................. 202041045138

(51) Int. Cl.
*G01S 13/04*     (2006.01)
*G01S 7/35*      (2006.01)
(Continued)

(52) U.S. Cl.
CPC ................ *G01S 13/04* (2013.01); *G01S 7/35* (2013.01); *G06F 16/2264* (2019.01); *G06F 16/9017* (2019.01); *G06F 17/142* (2013.01)

(58) Field of Classification Search
CPC ............. G06F 9/30036; G06F 16/2264; G06F 16/9017; G06F 17/142; G01S 7/356
(Continued)

(56) References Cited

U.S. PATENT DOCUMENTS 3,810,082 A * 5/1974 Arens ..................... G01S 3/809
                                                            367/122
4,320,466 A    3/1982 Myers
(Continued)

FOREIGN PATENT DOCUMENTS

DE        102020111533 A1    10/2021

*Primary Examiner* — Michael W Justice
(74) *Attorney, Agent, or Firm* — Michael T. Gabrik; Frank D. Cimino

(57) ABSTRACT

Systems and instruction carrying non-transitory processor-readable mediums are provided to facilitate access of radar data that may be scattered or non-uniformly located within a region of memory for further processing of such radar data. An example system includes counters that increment on different dimensions of the memory region, a lookup table, multipliers, an adder, and a wraparound mechanism to access different sets of non-contiguously stored radar data from a region of memory. The wraparound mechanism performs a wraparound operation when a combined address, generated by the adder based on addresses obtained by the multipliers, is greater than a last valid address in the region. The wraparound operation generates a new combined address that is used to fetch data from the memory. A transform operation is then performed on the fetched data.

20 Claims, 10 Drawing Sheets

(51) Int. Cl.
*G06F 16/22* (2019.01)
*G06F 16/901* (2019.01)
*G06F 17/14* (2006.01)

(58) Field of Classification Search
USPC .......................... 708/404, 520; 342/196, 27
See application file for complete search history.

(56) References Cited

U.S. PATENT DOCUMENTS

| | | | | |
|---|---|---|---|---|
| 4,618,863 A * | 10/1986 | Collins | ................ | G01S 13/342 |
| | | | | 342/194 |
| 5,615,142 A * | 3/1997 | Hyatt | ................ | G11C 7/1042 |
| | | | | 365/45 |
| 5,619,445 A * | 4/1997 | Hyatt | ................ | G01S 15/897 |
| | | | | 365/45 |
| 5,625,583 A * | 4/1997 | Hyatt | ................ | G05B 19/351 |
| | | | | 365/45 |
| 5,646,623 A | 7/1997 | Walkers et al. | | |
| 5,875,264 A * | 2/1999 | Carlstrom | ............ | G06V 30/184 |
| | | | | 382/181 |
| 5,936,859 A | 8/1999 | Huang | ................ | G06T 3/4007 |
| | | | | 375/354 |
| 6,232,922 B1 * | 5/2001 | McIntosh | ............... | G01S 19/14 |
| | | | | 342/453 |
| 7,420,502 B2 * | 9/2008 | Hartzstein | ............. | H01Q 19/17 |
| | | | | 342/72 |
| 9,774,299 B2 | 9/2017 | Staudinger et al. | | |
| 9,780,680 B2 * | 10/2017 | Bhardwaj | ............... | H02M 5/04 |
| 10,027,284 B2 | 7/2018 | Staudinger et al. | | |
| 10,114,103 B2 | 10/2018 | Jones | | |
| 10,151,833 B2 * | 12/2018 | Borgonovo | ........... | G01S 7/2922 |
| 10,634,783 B2 * | 4/2020 | Borgonovo | ........... | G01S 7/2806 |
| 10,649,775 B2 | 5/2020 | Zbiciak | | |
| 10,746,841 B2 | 8/2020 | Jones | | |
| 10,754,008 B2 | 8/2020 | Raphaeli et al. | | |
| 11,531,086 B2 * | 12/2022 | Roger | ..................... | G01S 7/356 |
| 11,644,834 B2 * | 5/2023 | Ditty | ................... | G06F 15/7807 |
| | | | | 701/23 |
| 2005/0285773 A1 * | 12/2005 | Hartzstein | ........... | H01Q 1/3233 |
| | | | | 342/107 |
| 2016/0334512 A1 * | 11/2016 | Borgonovo | ......... | G01S 13/5246 |
| 2017/0099006 A1 * | 4/2017 | Bhardwaj | ............. | H02M 3/156 |
| 2017/0269601 A1 | 9/2017 | Jones | | |
| 2017/0363711 A1 | 12/2017 | Rao et al. | | |
| 2018/0313928 A1 | 11/2018 | Jones | | |
| 2019/0102178 A1 * | 4/2019 | Zbiciak | ............... | G06F 9/30098 |
| 2019/0107620 A1 * | 4/2019 | Borgonovo | ........... | G01S 7/2922 |
| 2019/0146058 A1 * | 5/2019 | Roger | ..................... | G01S 7/288 |
| | | | | 342/175 |
| 2019/0250249 A1 | 8/2019 | Raphaeli et al. | | |
| 2019/0258251 A1 * | 8/2019 | Ditty | ................... | G05D 1/0274 |
| 2019/0294650 A1 * | 9/2019 | Kim | ..................... | G06F 9/3001 |
| 2021/0333386 A1 * | 10/2021 | Park | ....................... | G01S 7/356 |

* cited by examiner

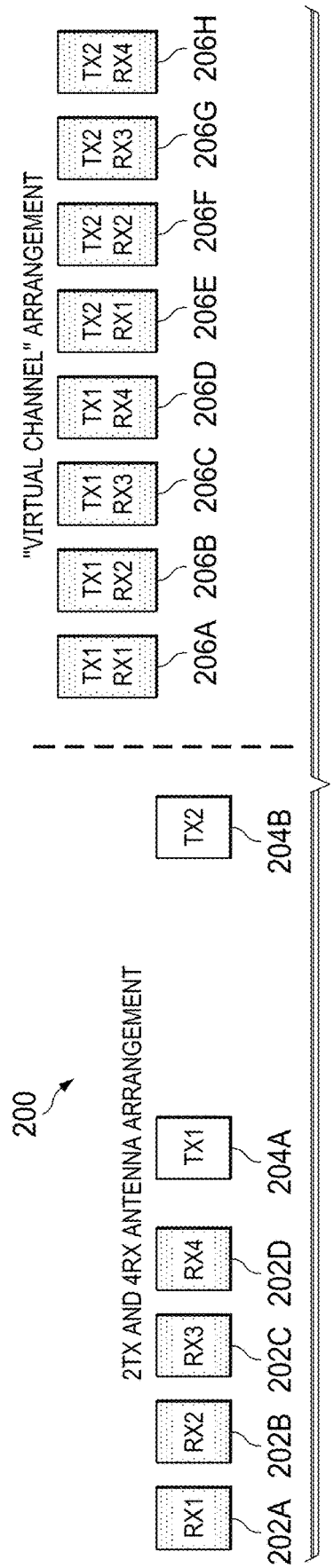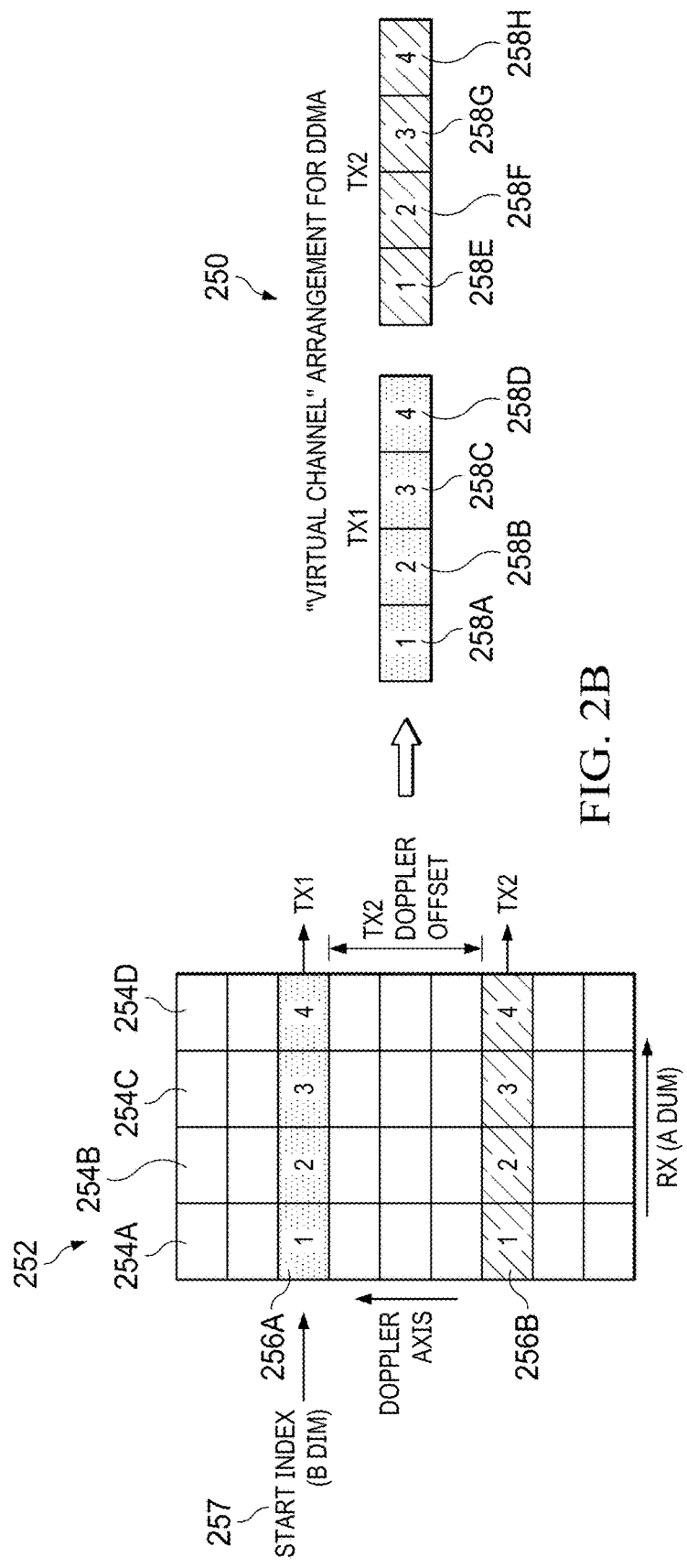
FIG. 2A
FIG. 2B

| 702 | CLOCK | 0 | 12 | ∘ ∘ ∘ | 156 | 168 | ∘ ∘ ∘ | 456 | 468 |
|---|---|---|---|---|---|---|---|---|---|
| 704 | DOPPLER BIN NUMBER (B DIM) | 0 | 1 | ∘ ∘ ∘ | 13 | 14 | ∘ ∘ ∘ | 38 | 39 |

| 706 | AoA DIMENSION FFT INPUT (A DIM AFTER SHUFFLE) | | | | | | | | | | | |
|---|---|---|---|---|---|---|---|---|---|---|---|---|
| | | 0 | 1 | 2 | 3 | ∘∘∘ | 100 | 101 | 102 | 103 | 200 | 201 | 202 | 203 |
| | | 4 | 5 | 6 | 7 | ∘∘∘ | 104 | 105 | 106 | 107 | 204 | 205 | 206 | 207 |
| | | ∘∘∘ | | | | | ∘∘∘ | | | | ∘∘∘ | | | |
| | | 52 | 53 | 54 | 55 | ∘∘∘ | 152 | 153 | 154 | 155 | 252 | 253 | 254 | 255 |
| | | 56 | 57 | 58 | 59 | ∘∘∘ | 156 | 157 | 158 | 159 | 256 | 257 | 258 | 259 |
| | | ∘∘∘ | | | | | ∘∘∘ | | | | ∘∘∘ | | | |
| | | 152 | 153 | 154 | 155 | ∘∘∘ | 252 | 253 | 254 | 255 | 352 | 353 | 354 | 355 |
| | | 156 | 157 | 158 | 159 | ∘∘∘ | 256 | 257 | 258 | 259 | 356 | 357 | 358 | 359 |

| 708 | AoA DIMENSION FFT INPUT (WITH APPROPRIATE WRAPPING) | | | | | | | | | | | |
|---|---|---|---|---|---|---|---|---|---|---|---|---|
| | | 0 | 1 | 2 | 3 | ∘∘∘ | 100 | 101 | 102 | 103 | 200 | 201 | 202 | 203 |
| | | 4 | 5 | 6 | 7 | ∘∘∘ | 104 | 105 | 106 | 107 | 204 | 205 | 206 | 207 |
| | | ∘∘∘ | | | | | ∘∘∘ | | | | ∘∘∘ | | | |
| | | 52 | 53 | 54 | 55 | ∘∘∘ | 152 | 153 | 154 | 155 | 252 | 253 | 254 | 255 |
| | | 56 | 57 | 58 | 59 | ∘∘∘ | 156 | 157 | 158 | 159 | 0 | 1 | 2 | 3 |
| | | ∘∘∘ | | | | | ∘∘∘ | | | | ∘∘∘ | | | |
| | | 152 | 153 | 154 | 155 | ∘∘∘ | 252 | 253 | 254 | 255 | 96 | 97 | 98 | 99 |
| | | 156 | 157 | 158 | 159 | ∘∘∘ | 0 | 1 | 2 | 3 | 100 | 101 | 102 | 103 |

FIG. 7

NON-UNIFORM MULTI-DIMENSIONAL DATA ACCESS FOR RADAR DATA PROCESSING

CROSS-REFERENCE TO RELATED APPLICATIONS

The present application is a continuation of, and claims priority to, U.S. patent application Ser. No. 17/351,654, filed Jun. 18, 2021, which claims priority to Indian Provisional Patent Application No. 202041045138, filed Oct. 16, 2020, and titled "Non-Uniform Multi-Dimensional Data Access For Radar Data Processing," each of which is incorporated by reference herein in their entireties.

BACKGROUND

Radar is used in many applications to detect target objects. Radar is used in automotive applications for features such as cruise control, collision warning, blind spot warning, lane change assist, parking assist, and rear collision warning. In a multiple-input multiple-output (MIMO) frequency-modulated continuous-wave (FMCW) radar system, multiple transmitters and receivers are used. The frequencies of the one or more transmit signals from the transmitters are varied linearly with time. The transmit signals are referred to as ramp signals or chirp signals. A target object scatters (or reflects) the transmit signals, which are then received by the receive units in the FMCW radar system. A processor performs one or more fast Fourier transforms (FFTs) on the received data. A peak in the FFT corresponds to a target object.

SUMMARY

In an example, a system includes a memory having a region configured to store radar data such that a first set of locations in the region is configured to store radar data of a first transmitter and a second set of locations in the region is configured to store radar data of a second transmitter, in which the second set of locations is non-contiguous with, and offset from, the first set of locations; a first counter configured to increment in a first instance to a set value on a first dimension of the region to identify locations in the region where radar data of the first transmitter are stored, and increment in a second instance to the set value on a second dimension of the region to identify locations in the region where radar data of the second transmitter are stored; a second counter configured to increment between the first instance of incrementing by the first counter and the second instance of incrementing by the first counter; a lookup table (LUT) configured to store indicators of locations in the region; a first multiplier configured to provide a first address based on a first count value of the first counter; a second multiplier configured to provide a second address based on a second count value of the second counter; an adder coupled to the first and second multipliers and configured to provide a combined address based on the first and second addresses; and a wraparound mechanism coupled to the adder and configured to perform a wraparound operation when the combined address is greater than a last valid address in the region to generate a new combined address.

In another example, a non-transitory processor-readable medium storing instructions is provided. The instructions, when executed by one or more processors, cause a system that includes the one or more processors to store radar data in a region of a memory, wherein first radar data of a first transmitter of the system is stored in a first set of locations in the memory and second radar data of a second transmitter of the system is stored in a second set of locations in the memory, in which the second set of locations is non-contiguous with, and offset from, the first set of locations; increment, in a first instance and using a first counter, a first count on a first dimension of the region starting at a first location in the memory up to a set value, thereafter incrementing, using a second counter, a count on a second dimension of the region, and incrementing, in a second instance and using the first counter, a second count on the first dimension starting at a second location in the region up to the set value; retrieve the first radar data from the region using multiplier and adder circuitry, wherein a location of the first radar data in the region is selected from a lookup table (LUT) based on the first count; retrieve from the region using the multiplier and adder circuitry, wherein a location of the second radar data in the region is selected from the LUT based on the second count; and perform a transform operation on the retrieved first and second radar data.

In yet another example, a non-transitory processor-readable medium storing instructions is provided. The instructions, when executed by one or more processors, cause a system that includes the one or more processors to store radar data in a region of a memory, wherein first radar data of a first transmitter of the system is stored in a first set of locations in the memory and radar data of a second transmitter of the system is stored in a second set of locations in the memory, in which the second set of locations is non-contiguous with, and offset from, the first set of locations; increment, in a first instance and using a first counter, a first count on a first dimension of the region starting at a first location in the memory up to a set value, thereafter incrementing, using a second counter, a count on a second dimension of the region, and incrementing, in a second instance and using the first counter, a second count on the first dimension starting at a second location in the region up to the set value; retrieve the first radar data from the region using multiplier and adder circuitry, wherein a location of the first radar data in the region is selected from a lookup table (LUT) based on the first count; retrieve the second radar data from the region using the multiplier and adder circuitry and a wraparound mechanism when an address provided by the multiplier and adder circuitry indicates a location of the second radar data outside of the region, and wherein the second radar data is retrieved by wrapping around, using the wraparound mechanism, to a valid location in the region; and perform a transform operation on the first radar data and the second radar data.

BRIEF DESCRIPTION OF THE DRAWINGS

FIG. 2A is a diagram of a virtual channel arrangement in accordance with various examples.

FIG. 2B is a diagram of a virtual channel arrangement in accordance with various examples.

FIG. 7 is a diagram of data structures that demonstrate the wraparound mechanism in accordance with various examples.

DETAILED DESCRIPTION

A MIMO radar system, with multiple transmitters and receivers, may transmit on all transmitters simultaneously. The transmitters use phase shift sequences, with different transmitters employing different phase shift sequences for their respective chirps. The receivers receive the chirps simultaneously. The received signals are processed using FFTs, and the phase shifts allow the signals produced by the different transmitters to be distinguished. A first FFT of the received signals for all receivers and all chirps produces a range spectrum. A second FFT of the range spectrum produces a Doppler spectrum. A third FFT of the Doppler spectrum produces an angle spectrum. In such a MIMO system, where transmitters are transmitting with different phase shift sequences, the Doppler spectrum data corresponding to different transmitters is stored in non-contiguous locations in memory. If the phase shift sequences increase linearly at a fixed phase difference that is unique for each transmitter, the superposed Doppler spectrum includes Doppler spectrums of individual transmitters that are shifted in memory. These shifts within the memory are proportional to the phase shift difference of each transmitter. In some alternative systems, the Doppler spectrum data from the memory is rearranged before the third FFT is performed. Rearranging the data is inefficient and slows down the received signal processing.

In examples herein, a shuffle lookup table (LUT) operates as a guide for the Doppler spectrum data stored in memory. The shuffle LUT indicates where the spectrum data elements are located in memory relative to a start index. The shuffle LUT values, and the locations in memory where the spectrum data elements are located, are based on the amount of Doppler offset between the various transmitters. The shuffle LUT values are useful for selecting the data elements from memory so FFTs may be performed on the data from a given transmitter. Also, in another example, the LUT may point to a data fetch address that is outside of the locations in memory where the valid data set is stored. In those cases, a wraparound procedure is useful, which converts the data fetch address outside of the memory locations where valid data is stored to the correct address inside the memory locations where the requested data is stored. If the requested address is beyond the last valid address, a data fetch mechanism returns to the proper address within the valid address set where the data can be found. A subtraction or modulo operation may be performed to retrieve the wraparound address, which is the address in the valid address set where the requested data is stored. Then, the address in the valid address set is used to fetch data from a random access memory (RAM) to perform the FFT operations.

Figure 1A:
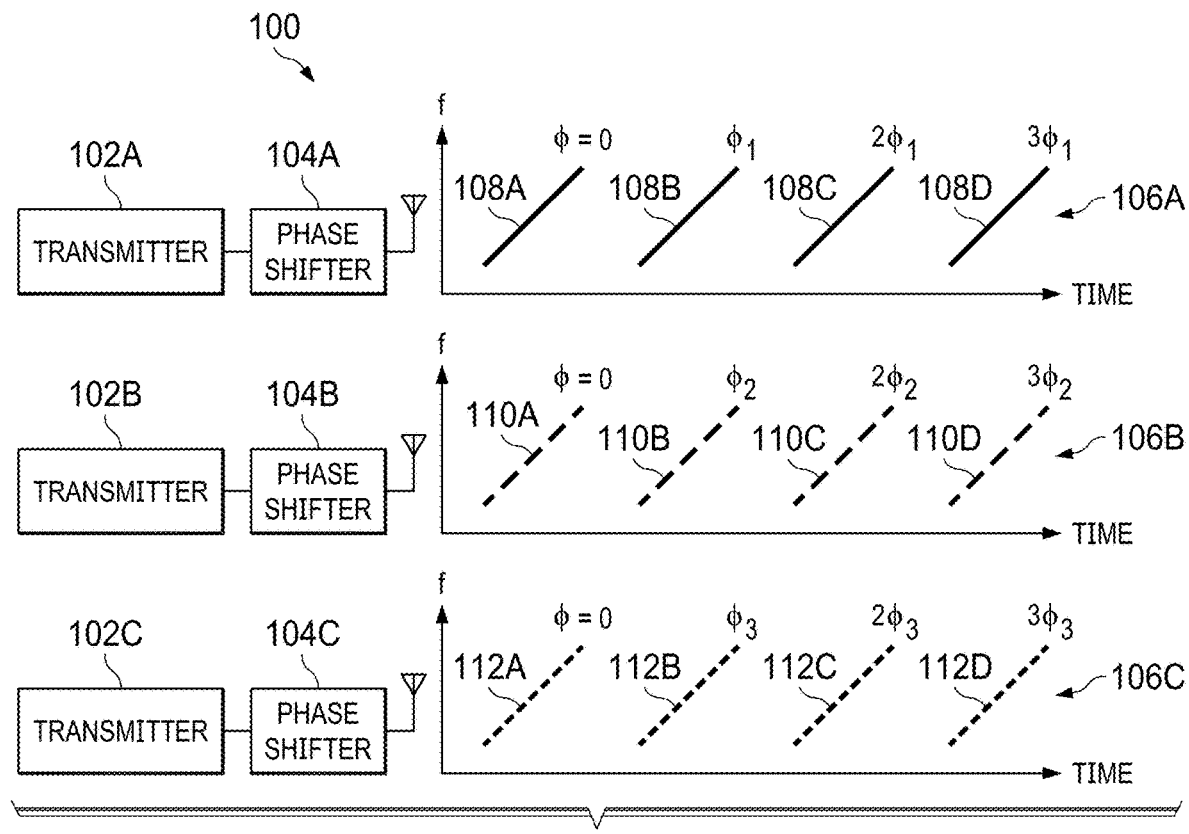
FIG. 1A is a diagram of transmitters in a MIMO system in accordance with various examples.

FIG. 1A is a diagram of transmitters in a MIMO system 100, in accordance with various examples herein. MIMO system 100 includes three transmitters 102A, 102B, and 102C (collectively, transmitters 102). Transmitter 102A is coupled to phase shifter 104A, transmitter 102B is coupled to phase shifter 104B, and transmitter 102C is coupled to phase shifter 104C. MIMO system 100 also includes a number of receivers that are not shown in FIG. 1A.

FIG. 1A also includes a graph of chirps for each transmitter 102. Graph 106A shows chirps for transmitter 102A, graph 106B shows chirps for transmitter 102B, and graph 106C shows chirps for transmitter 102C (collectively, graphs 106). The x-axis of each graph 106 represents time, while the y-axis represents frequency. Each slanted line in graphs 106A, 106B, and 106C represents a chirp from the respective transmitter 102. The frequency of each chirp increases with time which is represented by the upward slanting lines on each graph 106. Because the chirps increase in frequency, MIMO system 100 is an FMCW system. Chirps are transmitted on each transmitter 102 simultaneously. The phase is shifted across chirps from a transmitter 102. For example, graph 106A shows chirps 108A, 108B, 108C, and 108D (collectively, chirps 108) from transmitter 102A. The first chirp, 108A, has a phase shift of 0 ($\Phi=0$). The second chirp, 108B, has a phase shift of $\Phi_1$. The third chirp, 108C, has a phase shift of $2\Phi_1$. The fourth chirp, 108D, has a phase of $3\Phi_1$. The phase increases by $\Phi_1$ for each chirp 108. Phase shifter 104A introduces the phase shift for the chirps 108 from transmitter 102A.

Graph 106B shows chirps 110A, 110B, 110C, and 110D (collectively, chirps 110) from transmitter 102B. The first chirp, 110A, has a phase shift of 0. The second chirp, 110B, has a phase shift of $\Phi_2$. The third chirp, 110C, has a phase shift of $2\Phi_2$. The fourth chirp, 110D, has a phase of $3\Phi_2$. The phase increases by $\Phi_2$ for each chirp 110. Phase shifter 104B introduces the phase shift for the chirps 110 from transmitter 102B.

Graph 106C shows chirps 112A, 112B, 112C, and 112D (collectively, chirps 112) from transmitter 102C. The first chirp, 112A, has a phase shift of 0. The second chirp, 112B, has a phase shift of $\Phi_3$. The third chirp, 112C, has a phase shift of $2\Phi_3$. The fourth chirp, 112D, has a phase of $3\Phi_3$. The phase increases by $\Phi_3$ for each chirp 112. Phase shifter 104C introduces the phase shift for the chirps 112 from transmitter 102C.

The receivers in MIMO system 100 each receive every chirp (108, 110, and 112) from the transmitters 102. The phase shifts described above create a phase difference between the chirps. Chirps from transmitter 102A have a phase shift of $\Phi_1$ between each chirp. Chirps from transmitter 102B have a phase shift of $\Phi_2$ between each chirp. Chirps from transmitter 102C have a phase shift of $\Phi_3$ between each chirp. If $\Phi_1$, $\Phi_2$, and $\Phi_3$ are different, peaks in the Doppler frequency are found by performing FFTs on the received chirps from the various transmitters as described below with respect to FIG. 1B. The transmitters are distinguished by the different peaks occurring at different Doppler frequencies, which is caused by the phase differences between the chirps from each transmitter. MIMO system 100 is therefore a Doppler division multiple access (DDMA) system. The received chirp data may be stored in non-contiguous locations in memory. As described below, MIMO system 100 processes received chirps (108, 110, and 112) in a manner that tracks and locates data stored in non-contiguous locations in memory in accordance with various examples herein. According to examples herein, data is fetched from memory with the use of a LUT and a wraparound mechanism to process the data efficiently.

Figure 1B:
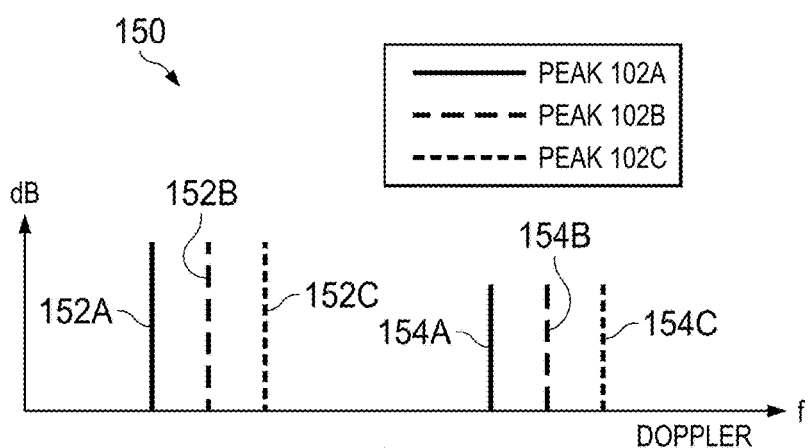
FIG. 1B is a graph of a Doppler spectrum of received chirps in accordance with various examples.

FIG. 1B is an example graph 150 of a Doppler spectrum of received chirps (108, 110, and 112) from FIG. 1A. The x-axis of graph 150 represents the Doppler frequency. The y-axis represents the strength of the signal in decibels (dB). As described above, in this example, three transmitters 102 transmit chirps (108, 110, and 112) simultaneously and one or more receivers receive each of the chirps from each transmitter 102. Graph 150 represents the chirps (108, 110, and 112) received by one receiver. If MIMO system 100 has other receivers, a graph such as graph 150 may be created for each receiver.

A first step of processing the received chirp data is to take an FFT of the data from all receivers and all chirps. The result of this first FFT is a range spectrum. Then, a second FFT operation across chirps for each range bin produces a Doppler spectrum, like graph 150 (as an example for a particular range bin and a particular receiver). Graph 150 shows an example of two objects detected by one receiver in MIMO system 100. In graph 150, peaks 152A, 152B, and 152C represent the first detected object. Peaks 154A, 154B, and 154C represent the second detected object. Each detected object is represented by three peaks in graph 150 because there are three transmitters 102. Each of the two objects was detected by each transmitter 102 in this example. Peak 152A is a peak with a high power level that represents an object as seen by the chirps 108 from transmitter 102A, which have a phase difference of $\Phi_1$ among them. Peak 152B is a peak that represents an object as seen by the chirps 110 from transmitter 102B, which have a phase difference of $\Phi_2$ among them. Peak 152C is a peak that represents an object as seen by the chirps 112 from transmitter 102C, which have a phase difference of $\Phi_3$ among them. Peaks 152A, 152B, and 152C may be distinguished in the Doppler spectrum, represented by graph 150, because the chirps of the transmitters that produced those signals are encoded with different phase shift sequences. $\Phi_1$ is different than $\Phi_2$, which is different than $\Phi_3$ in this example. Because the transmitters 102 transmit chirps with different phase shift sequences, the peaks from the various transmitters 102 appear at different Doppler frequencies in graph 150. The differentiation of these peaks in the Doppler spectrum is an example of DDMA. The differentiation of the peaks allows for the received signals to be processed separately, which is useful for radar detection.

The phases $\Phi_1$, $\Phi_2$, and $\Phi_3$ are separated by a known constant $\psi$. In one example, the difference between $\Phi_1$ and $\Phi_2$, is $\psi$, and the difference between $\Phi_1$ and $\Phi_3$ is $2\psi$. The difference is a known value, which allows the signals from the various transmitters 102 to be distinguished for received signal processing.

Graph 150 also includes peaks 154A, 154B, and 154C that represent a second target object detected by MIMO system 100. Peaks 154A, 154B, and 154C are also separated by the known frequency $\psi$. The frequency difference in the phases of peaks 154A, 154B, and 154C allows those peaks (154A, 154B, and 154C) to be distinguished for received signal processing. In various examples herein, and described below, MIMO system 100 processes received chirps in a manner that tracks and locates data stored in non-contiguous locations in memory.

FIG. 2A is a diagram 200 of virtual channel arrangement in accordance with various examples herein. In this example, the MIMO system includes four receivers and two transmitters. Receivers 202A, 202B, 202C, and 202D (collectively, receivers 202) receive the signals transmitted by transmitters 204A and 204B (collectively, transmitters 204), in accordance with the examples described above. To compute the angle spectrum, the receiver/transmitter combinations are separated into an equivalent arrangement. The equivalent arrangement provides eight receiver 202/transmitter 204 combinations, shown as 206A through 206H (collectively, combinations 206). An FFT is then performed over each of the combinations 206 to compute the angle spectrum.

FIG. 2B is a diagram 250 of virtual channel arrangement for a DDMA system in accordance with various examples herein. In this example, the MIMO system includes four receivers 202 and two transmitters 204. Data structure 252 is populated based on the data received by the receivers 202. For example, a set of samples obtained by the receivers 202 undergoes a range FFT to produce a range data structure that includes an array of range values per receiver/transmitter pair and per set of chirps. In turn, the range data structure undergoes a Doppler FFT to produce the data structure 252 that includes an array of Doppler values per receiver/transmitter pair and per set of chirps. Data structure 252 may be any suitable representation of the radar data stored in a memory, and is a two-dimensional data structure in this example. In data structure 252, each column 254 represents one of the four receivers 202. The data in each column 254 represents a Doppler spectrum for that receiver 202. Column 254A stores data for the first receiver 202A, column 254B stores data for the second receiver 202B, column 254C stores data for the third receiver 202C, and column 254D stores data for the fourth receiver 202D. As different peaks in the Doppler spectrum correspond to different transmitters 204, each cell in data structure 252 represents a specific receiver 202/transmitter 204 combination. The y-axis is also known as the Doppler axis in this example. The x-axis, which corresponds to the receivers 202, is referred to herein as the A dimension, while the y-axis, which corresponds to the transmitters 204, is referred to herein as the B dimension.

In a DDMA system, the transmitters 204 are separated in the Doppler spectrum, as shown in data structure 252. Accordingly, each row in data structure 252 represents a Doppler frequency bin. In this example, if the peak for transmitter 204A (TX1) is stored in the third row 256A of data structure 252, then the corresponding peak for transmitter 204B (TX2) is stored in the seventh row 256B of data structure 252, if the known Doppler offset between the first and second transmitters (e.g., $\Phi_1-\Phi_2$) is four bins. The data for transmitter 204A is separated from the data for transmitter 204B by an offset of four rows, because the data is at a different Doppler frequency for transmitter 204B. This four-row offset occurs because of the different phase sequences of transmitter 204A and transmitter 204B. As described above with respect the discussion of FIGS. 1A and 1B, phase shifters 104 introduce a phase shift between chirps (108, 110, 112) from different transmitters 102. The size of the phase shift is represented by the TX2 Doppler offset in data structure 252, which is four rows in this example. Because the phase shift between transmitters 204 is known, the Doppler offset in data structure 252 is known as well. This known Doppler offset in data structure 252 allows data to be retrieved for processing from data structure 252 in a programmed order by a data fetch mechanism. In this example, only the offset between transmitters is known. It is not known which peak corresponds to which transmitter. Therefore, every possible combination is fetched using the known offset and then processed for angle spectrum. The correct transmitter-to-peak associations may be determined from the angle spectrums. The data fetch mechanism may be a controller, processor, hardware accelerator, or any other suitable hardware and/or software configured to retrieve data from data structure 252 for processing. If a third transmitter were used in this DDMA system, the data of the peak corresponding to the third transmitter would be stored in a different row than rows 256A or 256B, and so on for any other transmitters in the DDMA system. The data for those additional transmitters would also be fetched in the programmed order by the data fetch mechanism.

To perform the next operation in the processing of the radar data, such as the angle FFT, a scattered subset of data may be fetched from the data structure 252. For, example, a data fetch mechanism may extract the first four samples for transmitter 204A in row 256A, and then extract the second four samples for transmitter 204B in row 256B. The result is a virtual channel arrangement that is similar to the virtual channel arrangement of combinations 206 shown in FIG. 2A and described above. These receiver 202/transmitter 204 combinations are labeled 258A through 258H (collectively, combinations 258) in FIG. 2B. An FFT is then performed over each of the combinations 258 to compute the angle spectrum.

The data for angle spectrum processing stored in data structure 252 is stored in non-contiguous locations, such as rows 256A and 256B. In some alternative systems, a digital signal processor (DSP) or other processor rearranges the data within data structure 252 so that the data was located in contiguous locations, and then perform the FFT. However, this rearrangement process takes time and slows down the processing steps on the radar data. In contrast, in some examples herein, the data fetch mechanism that extracts the samples from data structure 252 uses an LUT to locate the proper rows to extract, as described in FIG. 3 below.

Figure 3:
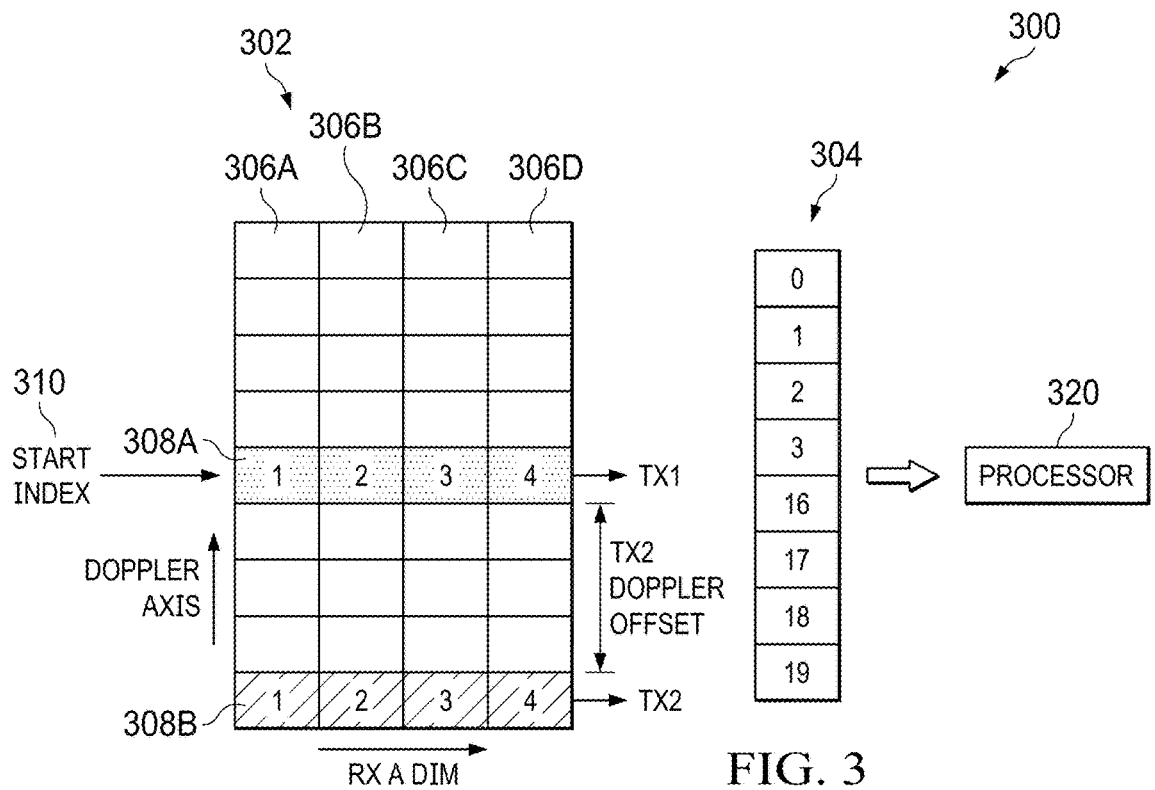
FIG. 3 is a diagram of a system for extracting data from a data structure in accordance with various examples.

FIG. 3 is a diagram of an example system 300 for extracting data from a data structure in accordance with various examples herein. System 300 includes a data structure 302, shuffle LUT 304, and processor 320. The x-axis of data structure 302 indicates a receiver, such as a receiver 202, and is referred to as the A-dimension. Columns 306A, 306B, 306C, and 306D each contain a Doppler spectrum for a receiver 202. The y-axis of data structure 302 indicates Doppler bins, and is referred to as the B-dimension. In this example, if row 308A stores the data for a first transmitter, such as transmitter 204A (TX1), then row 308B stores the data for a second transmitter, such as transmitter 204B (TX2). Here, the start index 310 is the fifth row of data structure 302, and the TX2 Doppler offset from TX1 is four rows.

Shuffle LUT 304 indicates where the data for transmitter 204B is located with respect to transmitter 204A within data structure 302. Each value in shuffle LUT 304 indicates an offset to apply to determine the indices of the data structure 302 to fetch from. A data fetch mechanism uses the values in shuffle LUT 304 to retrieve the correct data for FFT operations. In this example, shuffle LUT 304 indicates that the data in indices having offsets of 0, 1, 2, 3, 16, 17, 18 and 19 from the start index should be retrieved. In that regard, the count of these indices stored in shuffle LUT 304 begins at the start index 310, not necessarily at the top row of data structure 302. In this example, the start index 310 is the fifth row (308A), where the data for TX1 is stored. The phase offsets also determine the TX2 Doppler offset of four rows, as described above.

In this example, the data fetch mechanism retrieves the data in the order indicated by shuffle LUT 304. Beginning at the start index 310 of row 308A, data is retrieved from cells 0, 1, 2, and 3, which represents the signal transmitted from transmitter 204A (TX1) and received by each of the four receivers 202. Then, shuffle LUT 304 indicates that data from cells 16, 17, 18, and 19 should be retrieved. The data from these four cells represent the signals transmitted from transmitter 204B (TX2) and received by the four receivers 202. The next step is for the shuffle LUT 304 to update and indicate the next eight data cells for the data fetch mechanism to retrieve, or for the start index 310 to update to the next row and the data fetch mechanism to retrieve the next eight data cells.

The shuffle LUT 304 may be configured by a user to indicate the proper data values to retrieve from data structure 302. The values stored in shuffle LUT 304 are determined by the phase offsets of the transmitters 204A and 204B, which indicates where the received data will be stored in data structure 302. Therefore, shuffle LUT 304 is configured with index offsets 0, 1, 2, 3, 16, 17, 18, and 19 in this example due to the phase offsets of transmitters 204A and 204B. After data is retrieved by the data fetch mechanism, the data may be provided to processor 320 for processing.

In some examples, the start index 310 and the shuffle LUT 304 may indicate a data location that is outside of the range of the indices in data structure 302. In that case, a wrap-around mechanism is used so that the data fetch mechanism moves from the bottom of data structure 302 to the top of data structure 302 to retrieve the requested data. The wrap-around mechanism is discussed with respect to FIGS. 5A, 5B, 6, and 7 below.

Figure 4:
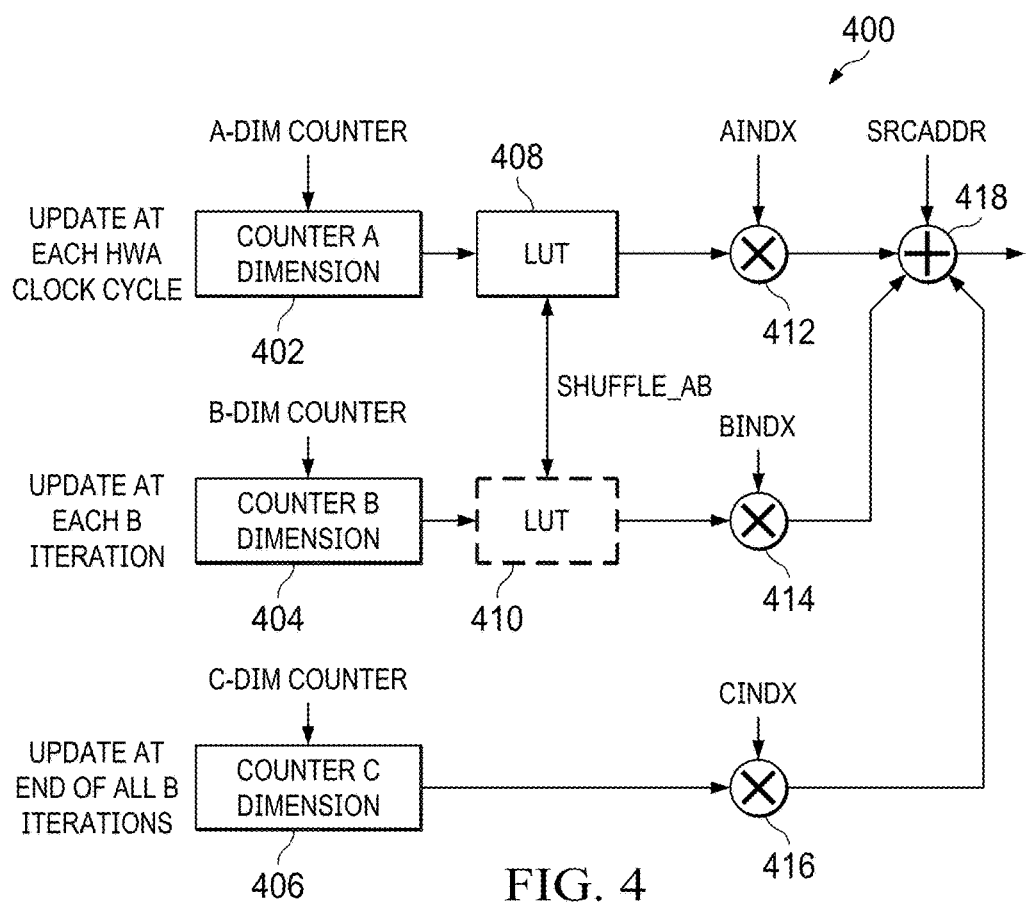
FIG. 4 is a diagram of a data fetch mechanism in accordance with various examples.

FIG. 4 is a diagram of a data fetch mechanism 400 in accordance with various examples herein. Data fetch mechanism 400 operates in conjunction with a data structure, such as data structure 302, to retrieve radar data for processing. Data fetch mechanism 400 includes A dimension counter 402, B dimension counter 404, and C dimension counter 406. Data fetch mechanism 400 also includes shuffle LUTs 408 and 410. Data fetch mechanism 400 includes multipliers 412, 414, and 416, and adder 418.

Data fetch mechanism 400 provides the data stored in a data structure, such as data structure 302, to a memory or processor for further data processing, such as performing an FFT operation. Data fetch mechanism 400 uses counters, shuffle LUTs, and multipliers to determine the relative addressing of the data stored in data structure 302. Then, the actual memory location of the data is found using a physical source address combined with the relative addressing.

In an example, A dimension counter 402 increments at each clock cycle. A dimension counter 402 may also include a count for the A dimension, a circular shift start (e.g., a start index), and wraparound parameters. As described above with respect to the discussion of FIG. 3, the A dimension is the x-axis of the data structure 302. Therefore, data from a data cell is retrieved at each clock cycle in a given row along the A dimension. The A dimension counter 402 provides the count to the shuffle LUT 408, and then the shuffle LUT value from shuffle LUT 408 is combined with the A index at multiplier 412 to provide a relative address for the data stored in data structure 302. After multiplier 412, a source address is added with adder 418.

B dimensions counter 404 increments at each B dimension iteration. When A dimension counter 402 reaches its maximum value (eight in this example), B dimension counter 404 increments by one. As shown in data structure 302, the A dimension (e.g., the x-axis) constitutes four data cells for each transmitter. After the eighth data cell is reached (four data cells for each transmitter), the B dimension (e.g., the y-axis) increments by one and the mechanism moves to the next row down, where the A dimension starts again. After A dimension counter 402 reaches its maximum again, B dimension counter 404 again increments by one and the mechanism moves to the next row. An optional shuffle LUT 410 may also be useful for the B dimension, just as shuffle LUT 408 was useful for the A dimension. The B dimension counter 404 of the shuffle LUT 410 provides the counter value to multiplier 414, where the count is combined with the B index. The output from multiplier 412 is provided to adder 418 and combined with a source address to find the physical address in memory.

Data fetch mechanism 400 also includes a C dimension counter 406 in some examples. C dimension counter 406 works similarly to A dimension counter 402 and B dimension counter 404. C dimension counter 406 increments each time the counter for B dimension counter 404 reaches its maximum value. C dimension counter 406 provides three-dimensional address mechanisms if the data is stored in three dimensions. Only two dimensions are shown in FIG. 3, but in other examples the data may be stored with a third dimension using multiple data structures 302. A count from C dimension counter 406 is provided to multiplier 416, and then the output of multiplier 416 is provided to adder 418 to find the physical address in memory.

A wraparound mechanism may be useful when a generated address index is outside of the range of the indices in valid-data structure 302. The wraparound mechanism is described in FIGS. 5A, 5B, 6, and 7 below.

Figure 5A:
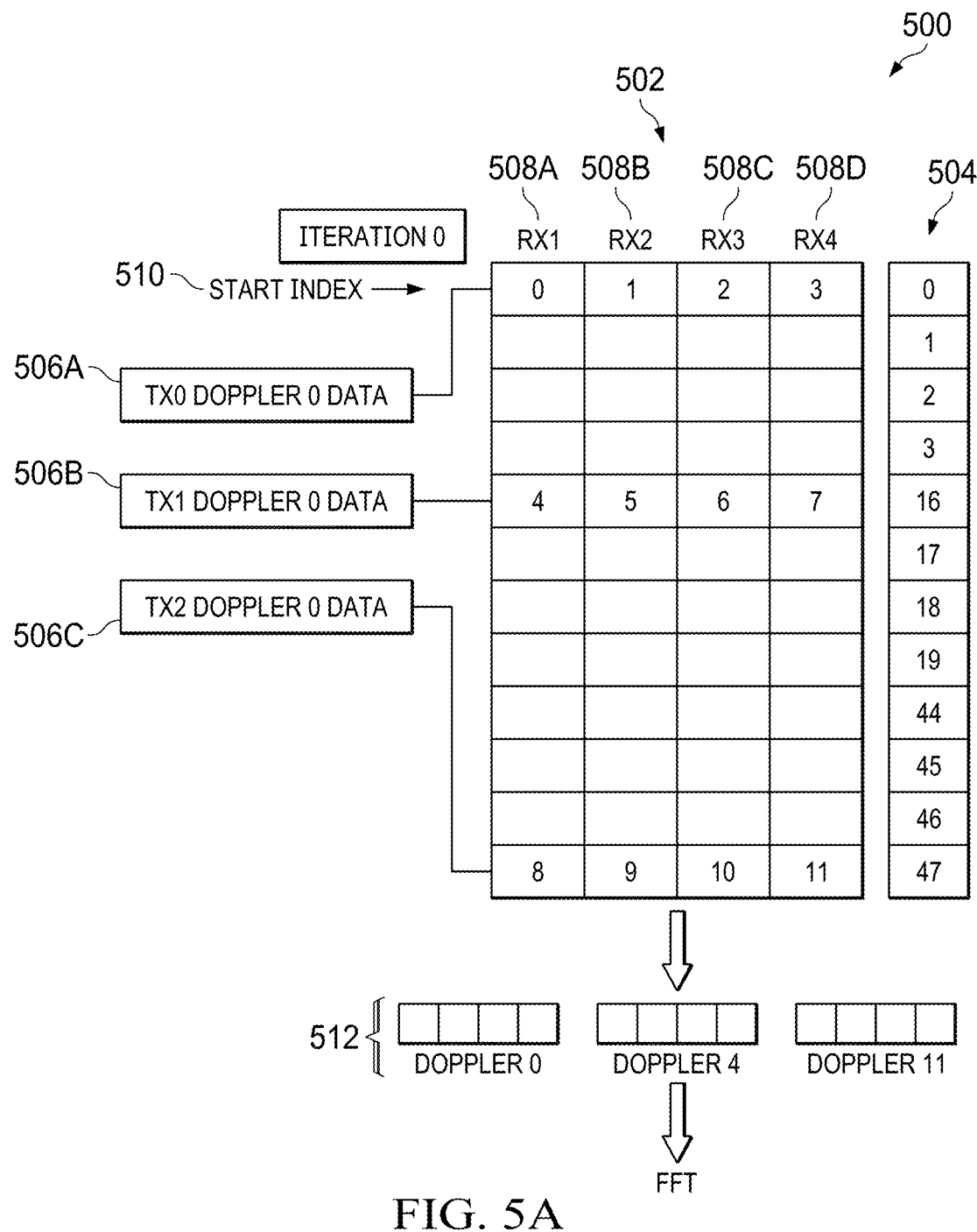
FIG. 5A is a diagram of a system for extracting data from a data structure with a wraparound mechanism in accordance with various examples.

FIG. 5A is a diagram of a system 500 for extracting data from a data structure with a wraparound mechanism in accordance with various examples herein. The wraparound mechanism may be a two-dimensional wraparound mechanism in some examples. System 500 includes a data structure 502 and shuffle LUT 504. In this example, the MIMO system has three transmitters 506A, 506B, and 506C (collectively, transmitters 506). The MIMO system has four receivers 508A, 508B, 508C, and 508D (collectively, receivers 508). In this example, the start index 510 is the first row, and therefore the Doppler data for the supposed first transmitter 506A (TX0) is in the first row (row 0) during the first iteration (B counter=0). Then, due to the Doppler offset, the Doppler data for the second transmitter 506B (TX1) is in the fifth row (row 4). Finally, the Doppler data for the third transmitter 506C (TX2) is in the twelfth row (row 11).

Shuffle LUT 504 indicates the data cells in data structure 502 that are fetched by the data fetch mechanism. The entries in shuffle LUT 504 are determined by the Doppler offset (e.g., the phase offsets) between transmitters 506A, 506B, and 506C. Here, the data cells in shuffle LUT 504 are 0, 1, 2, 3 16, 17, 18, 19, 44, 45, 46, and 47. In the first iteration (iteration 0), the data from those 12 data cells is fetched (rows 0, 4, and 11). Fetched data 512 is retrieved from data structure 502, and an FFT is then performed on the fetched data 512.

Figure 5B:
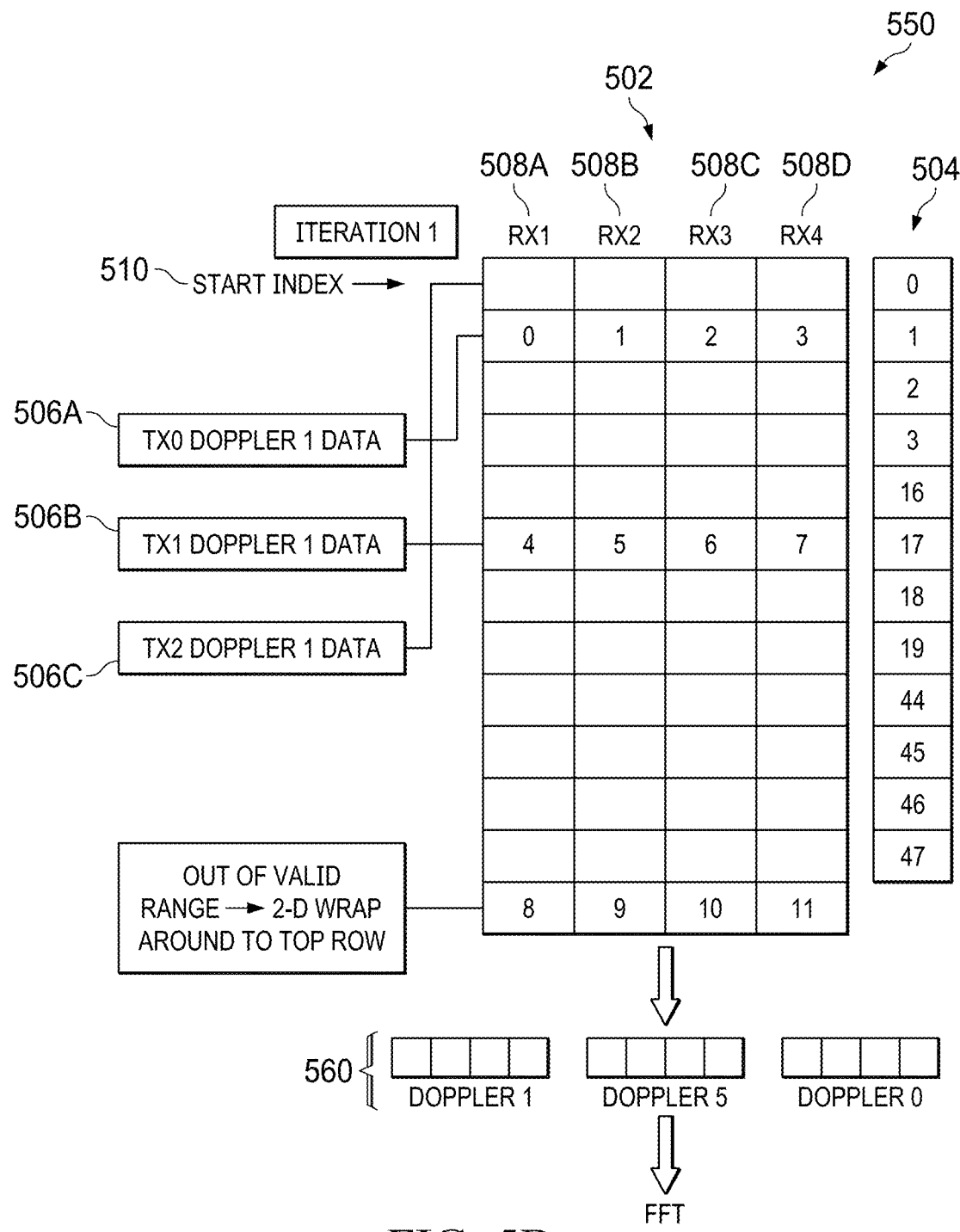
FIG. 5B is a diagram of a system for extracting data from a data structure with a wraparound mechanism in accordance with various examples.

FIG. 5B is a diagram of a system 550 for extracting data from a data structure with a wraparound mechanism in accordance with various examples herein. FIG. 5B is the next iteration, iteration 1, after the first iteration 0 shown in system 500 in FIG. 5A. In FIG. 5B, the start index 510 has incremented by 1 compared to FIG. 5A. Therefore, the rows from which data is extracted in data structure 502 each advance by one. System 550 includes the data structure 502 and shuffle LUT 504. In this iteration, the start index 510 is the second row, and therefore the Doppler data for the first transmitter 506A (TX0) is in the second row (row 1). Then, due to the Doppler offset, the Doppler data for the second transmitter 506B (TX1) is in the sixth row (row 5). Finally, the Doppler data for the third transmitter 506C (TX2) is in the thirteenth row. However, there are only twelve rows in data structure 502. In this example, a wraparound mechanism is used. The Doppler data is circular in nature, so the wraparound mechanism wraps around from the bottom of the data structure 502 to the top. Instead of the thirteenth row, the data fetch mechanism wraps to the top and retrieves data from row 0 at the top of data structure 502. Data is retrieved by the data fetch mechanism from rows 1, 5, and 0, in that order. Fetched data 560 is retrieved from data structure 502, and an FFT is then performed on the fetched data 560.

Figure 6:
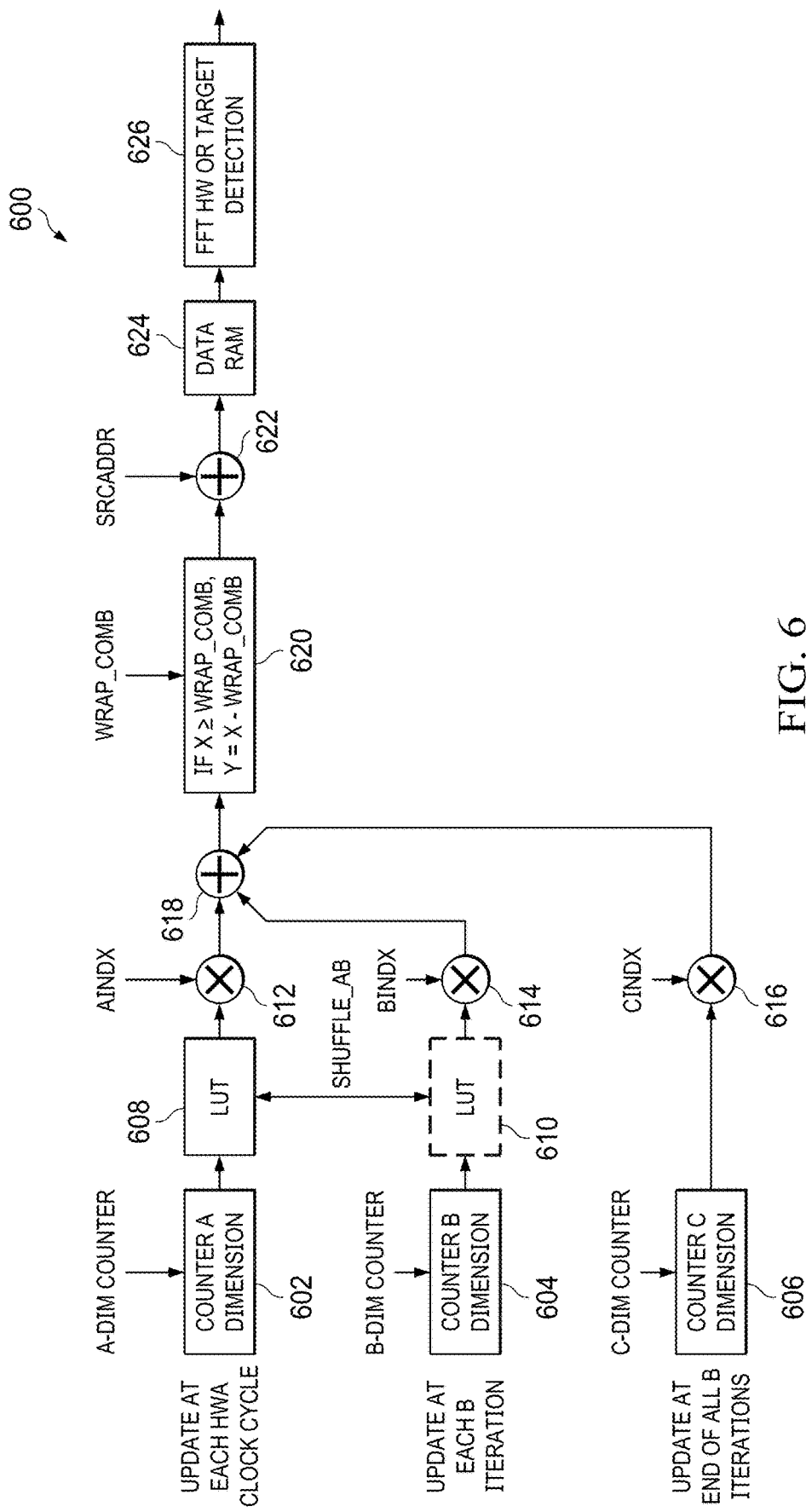
FIG. 6 is a diagram of a data fetch mechanism in accordance with various examples.

FIG. 6 is a diagram of a data fetch mechanism 600 in accordance with various examples herein. Data fetch mechanism 600 operates in conjunction with a data structure, such as data structure 302 or 502, to retrieve radar data for processing. Data fetch mechanism 600 includes A dimension counter 602, B dimension counter 604, and C dimension counter 606. Data fetch mechanism 600 also includes shuffle LUT mappers 608 and 610. Data fetch mechanism 600 includes multipliers 612, 614, and 616, and adder 618. These components operate similarly to the counterpart components in data fetch mechanism 400 described above with respect to the discussion of FIG. 4.

In data fetch mechanism 600, after the combined address of the A, B, and C dimensions is provided by adder 618, a wrap mechanism 620 performs a wraparound operation on the data set if needed. First, the last valid address of the data set is known. If the combined address from adder 618 is beyond the last valid address of the data set, a wraparound is performed to the proper address in the valid data set. A subtraction or modulo operation may be performed by wrap mechanism 620. If X is the combined address, and X is greater than the last valid address WRAP_COMB, then the new valid address Y equals X−WRAP_COMB. After wrap mechanism 620 performs the wraparound operation, an adder 622 produces the address in physical memory by adding a source address to the relative address from wrap mechanism 620. The data is forwarded to a data RAM 624, and then FFT hardware 626 performs an FFT operation. Target detection may also be performed in some examples.

FIG. 7 is a diagram of data structures 700 that demonstrate the wraparound mechanism in accordance with various examples herein. Clock 702 is shown on the left, with the numbers representing clock cycles. Doppler bin 704 is the B dimension variable (e.g., the start index row of the data structure, such as data structure 502). FFT input 706 shows the data cells retrieved by the data fetch mechanism before the wraparound operation is performed. Here, the data structure has four columns for four receivers (such as receivers 508) and 64 rows, which results in 256 data cells numbered 0 to 255. As an example, in a first iteration, the first row of FFT input 706 indicates the data retrieved from the data structure. For a first transmitter, data is retrieved from cells 0, 1, 2, and 3. Then, due to the Doppler offset, the data for the second transmitter is retrieved from cells 100, 101, 102, and 103. Finally, for the third transmitter, the data is retrieved from cells 200, 201, 202, and 203.

In the second iteration, the second row of FFT input 706 indicates the data retrieved from the data structure. The data fetch mechanism starts at row 1 (shown in Doppler bin 704), and retrieves data from cells 4, 5, 6, and 7 for the first transmitter. Then, the data for the second transmitter is retrieved from cells 104, 105, 106, and 107. Finally, for the third transmitter, the data is retrieved from cells 204, 205, 206, and 207.

This process continues as the clock cycles increase as shown in clock 702. At clock cycle 168, data is retrieved from the data structure beginning at Doppler bin number 14. The data fetch mechanism starts at row 14, and retrieves data from cells 56, 57, 58, and 59 for the first transmitter. Then, the data for the second transmitter is retrieved from cells 156, 157, 158, and 159. Finally, for the third transmitter, the data should be retrieved from cells 256, 257, 258, and 259. However, the data structure only has 256 meaningful data cells as described above, so the data for the third transmitter is out of range of the data structure. Therefore, the wraparound operation is performed. The results of the wraparound operation are shown in FFT input 708. FFT input 708 shows that for any values of data cells over 255, wraparound is performed. For example, instead of retrieving data from data cells 256, 257, 258, and 259, data is retrieved from data cells 0, 1, 2, and 3. Likewise, instead of retrieving data from data cells 352, 353, 354, and 355 as shown in FFT input 706, data is retrieved from data cells 96, 97, 98, and 99 as shown in FFT input 708. The wraparound mechanism retrieves the proper data when a data location is indicated that is out of range of the data structure that stores the radar data.

Figure 8:
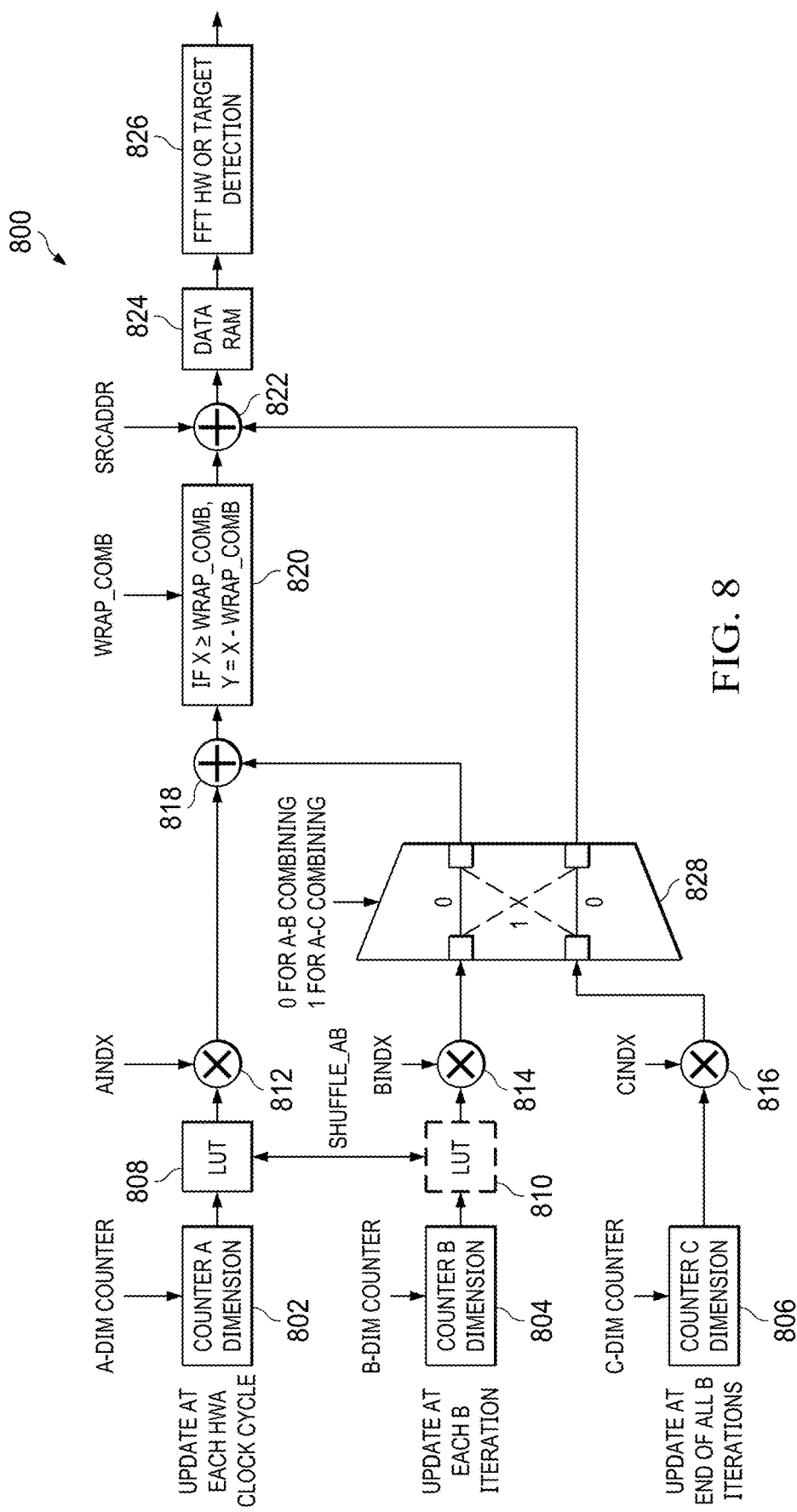
FIG. 8 is a diagram of a data fetch mechanism in accordance with various examples.

FIG. 8 is a diagram of a data fetch mechanism 800 in accordance with various examples herein. Data fetch mechanism 800 operates in conjunction with a data structure, such as data structure 302 or 502, to retrieve radar data for processing. Data fetch mechanism 800 includes A dimension counter 802, B dimension counter 804, and C dimension counter 806. Data fetch mechanism 800 also includes shuffle LUT mappers 808 and 810. Data fetch mechanism 800 includes multipliers 812, 814, and 816, and adder 818. These components operate similarly to the counterpart components in data fetch mechanism 400 described above with respect to FIG. 4.

Data fetch mechanism 800 also includes wrap mechanism 820, adder 822, data RAM 824, and FFT hardware 826. These components operate similarly to the counterpart components in data fetch mechanism 600 described above with respect to FIG. 6.

Data fetch mechanism 800 includes switch 828. Switch 828 is configured to select either A and B wraparound combining or A and C wraparound combining. For example, the data may be 3D data with data stored in the A, B, and C dimensions. If a 2D slice of the data is being processed (such as A and B), the third dimension does not need to be included in the wraparound mechanism. In that case, the C dimension counter moves the process to the next 2D data set after all B dimension iterations are processed. The output of multiplier 816 is coupled to adder 822 via switch 828 when A and B combining is performed, which updates the source address to the next 2D data set. Therefore, switch 828 is useful for selecting the type of wraparound combining.

Figure 9:
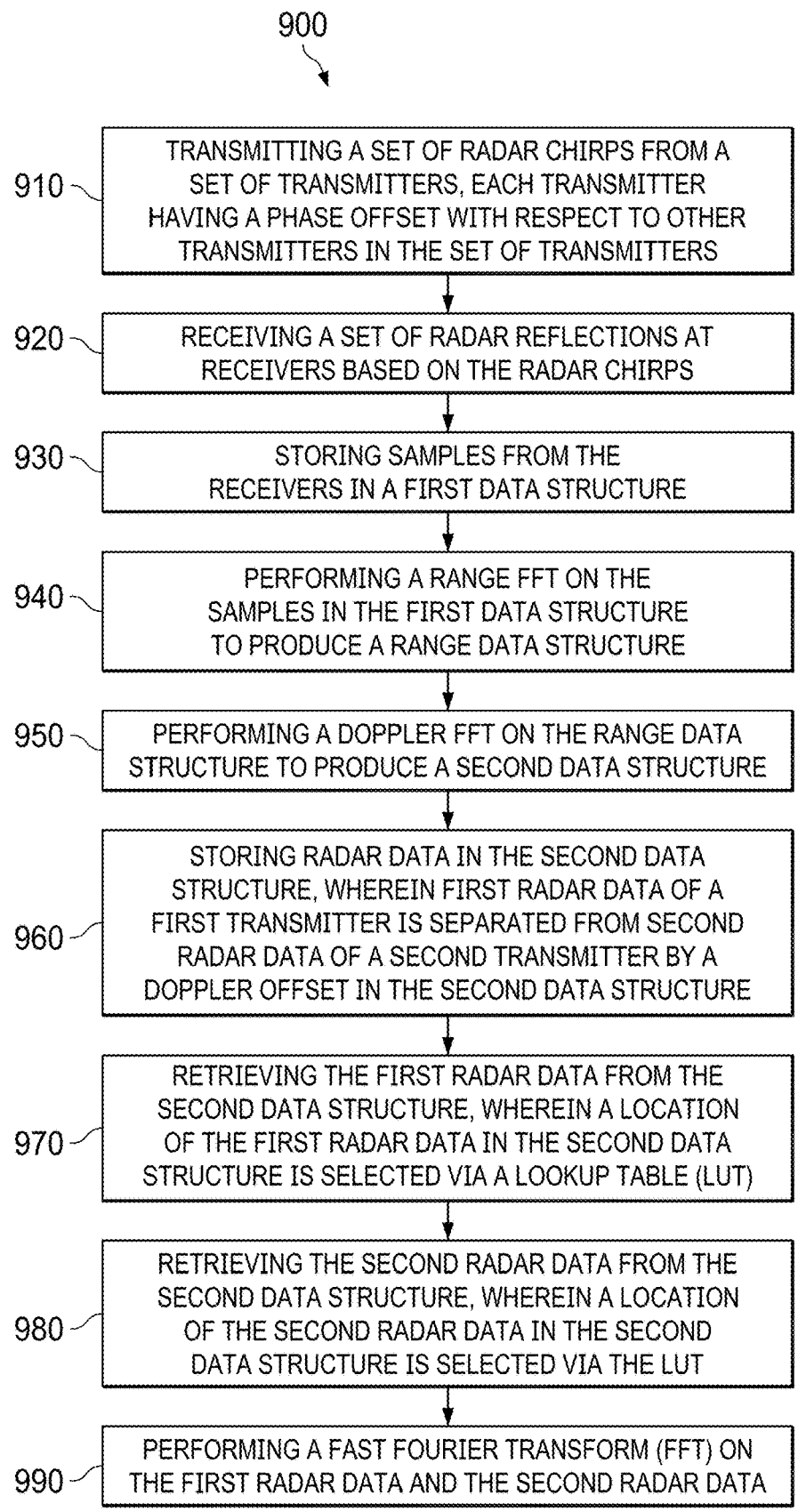
FIG. 9 is a flow diagram of a method for multi-dimensional data access for radar data processing in accordance with various examples.

FIG. 9 is a flow diagram of a method 900 for multi-dimensional data access for radar data processing in accordance with various examples herein. The steps of method 900 may be performed in any suitable order. The hardware components described above with respect to FIGS. 2A, 2B, 3, and 4 may perform method 900 in one example.

Method 900 begins at 910, where a set of transmitters transmit radar chips, with the radar chirps from one transmitter having a phase offset with respect to the radar chirps from the other transmitters in the set of transmitters. FIGS. 1A and 1B provide an example of these phase offsets.

Method 900 continues at 920, where one or more receivers receive a set of radar reflections based on the radar chirps. The radar chirps reflect off of an object, and those reflection are received at the one or more receivers.

Method 900 continues at 930, where samples from the one or more receivers are stored in a first data structure. At 940, a range FFT is performed on the samples of the first data structure. The range FFT produces a range data structure.

Method 900 continues at 950, where a Doppler FFT is performed on the range data structure to produce a second data structure. Performing the Doppler FFT to produce the second data structure is described with respect to FIG. 2B above.

Method 900 continues at 960, where radar data is stored in the second data structure, where first radar data of a first transmitter is separated from second radar data of a second transmitter by a Doppler offset in the second data structure. As described above with respect to FIG. 3, radar data is stored in data structure 302. First radar data of one transmitter is stored in a first row 308A of data structure 302, while second radar data of another transmitter is stored in a second row 308B of data structure 302. In the example shown in FIG. 3, first radar data is stored in the fifth row, while second radar data stored in the ninth row. The offset between these two rows (e.g., four rows) is based on the Doppler offset between the phases of the chirps of the two transmitters.

Method 900 continues at 970, where first radar data is retrieved from the second data structure, where a location of the first radar data in the second data structure is selected via an LUT. As shown in FIG. 3 and described above, shuffle LUT 304 indicates that the first radar data is located in locations 0, 1, 2, and 3 in data structure 302 (the second data structure). These locations are relative to the start index 310. Shuffle LUT 304 includes the correct locations from which to retrieve data from data structure 302 because the locations are based on the Doppler offset between first transmitter 204A and second transmitter 204B, and this Doppler offset information is used to populate the shuffle LUT 304. A data fetch mechanism, such as a processor, controller, or hardware accelerator, may fetch the data from data structure 302 for processing.

Method 900 continues at 980, where the second radar data is retrieved from the second data structure, where a location of the second radar data in the second data structure is selected via the LUT. As shown in FIG. 3 and described above, shuffle LUT 304 indicates that the second radar data is located in locations 16, 17, 18, and 19 in data structure 302. These locations are also relative to the start index 310. A data fetch mechanism, such as a processor, controller, or hardware accelerator, may fetch the data from data structure 302 for processing.

Method 900 continues at 990, where an FFT is performed on the first radar data and the second radar data. More data than the eight pieces of data shown in FIG. 3 may be retrieved before the FFT is performed. The data fetch mechanism may retrieve all appropriate data from data structure 302, and then process the data according to various examples herein. The FFT may be performed by any suitable processor, controller, hardware accelerator, or other hardware and/or software.

Figure 10:
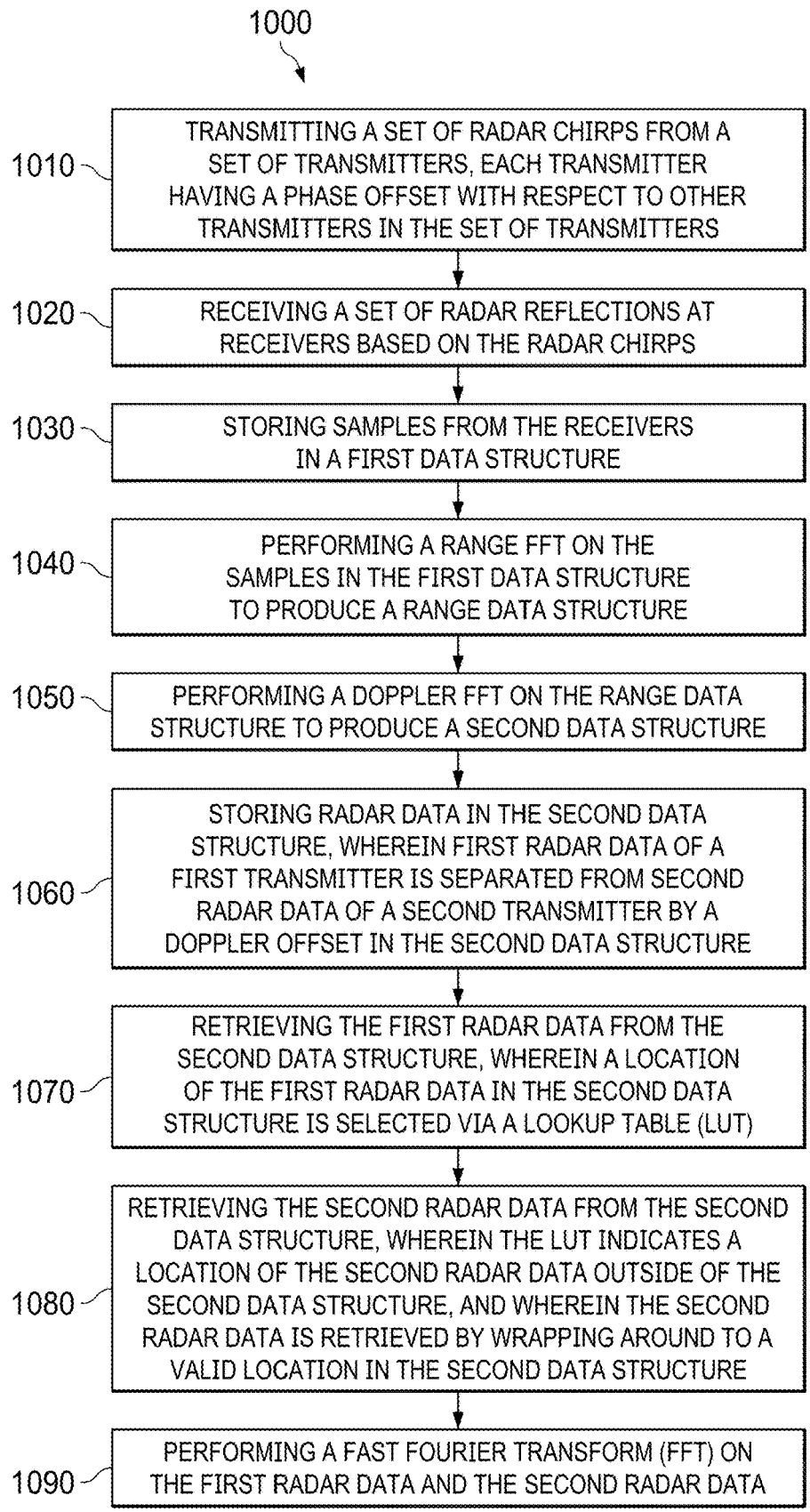
FIG. 10 is a flow diagram of a method for multi-dimensional data access for radar data processing in accordance with various examples.

FIG. 10 is a flow diagram of a method 1000 for multi-dimensional data access for radar data processing, in accordance with various examples herein. Method 1000 includes a wraparound mechanism in this example. The steps of method 1000 may be performed in any suitable order. The hardware components described above with respect to FIGS. 2A, 2B, 5A, 5B, and 6 can perform method 1000 in one example.

Method 1000 begins at 1010, where a set of transmitters transmit radar chips, with the radar chirps from one transmitter having a phase offset with respect to the radar chirps from the other transmitters in the set of transmitters. FIGS. 1A and 1B provide an example of these phase offsets.

Method 1000 continues at 1020, where one or more receivers receive a set of radar reflections based on the radar chirps. The radar chirps reflect off of an object, and those reflection are received at the one or more receivers.

Method 1000 continues at 1030, where samples from the one or more receivers are stored in a first data structure. At 1040, a range FFT is performed on the samples of the first data structure. The range FFT produces a range data structure.

Method 1000 continues at 1050, where a Doppler FFT is performed on the range data structure to produce a second data structure. Performing the Doppler FFT to produce the second data structure is described with respect to FIG. 2B above.

Method 1000 continues at 1060, where radar data is stored in the second data structure, where first radar data of a first transmitter is separated from second radar data of a second transmitter by a Doppler offset in the second data structure. As described above with respect to FIG. 5B, radar data is stored in data structure 502. First radar data is stored in the second row, while second radar data resides outside of data structure 502, before a wraparound is performed. Data structure 502 also includes radar data stored in the fifth row. The offset between these three rows is based on the Doppler offset between the phases of the chirps of transmitters 506A, 506B, and 506C.

Method 1000 continues at 1070, where first radar data is retrieved from the second data structure, where a location of the first radar data in the second data structure is selected via an LUT. As shown in FIG. 5B and described above, shuffle LUT 504 indicates that the first radar data is located in locations 0, 1, 2, and 3 in data structure 502. These locations are relative to the start index 510. Shuffle LUT 504 includes the correct locations from which to retrieve data from data structure 502 because the locations are based on the Doppler offsets between transmitters 506A, 506B, and 506C. A data fetch mechanism, such as a processor, controller, or hardware accelerator, may fetch the data from data structure 502 for processing.

Method 1000 continues at 1080, where second radar data is retrieved from the second data structure, where the LUT indicates a location of the second radar data outside of the second data structure, and where the second radar data is retrieved by wrapping around to a valid location in the second data structure. As shown in FIG. 5B and described above, shuffle LUT 504 indicates that the data from transmitter 506C is located at locations 44, 45, 46, and 47 from the start index 510. These locations are outside of data structure 502. Therefore, a wraparound mechanism wraps around to the top of data structure 502 to retrieve this radar data. In this example, the radar data is retrieved from the first row (row 0) of data structure 502. A data fetch mechanism, such as a processor, controller, or hardware accelerator, may fetch the data from data structure 502 for processing.

Method 1000 continues at 1090, where an FFT is performed on the first radar data and the second radar data. More data than the twelve pieces of data shown in FIG. 5B may be retrieved before the FFT is performed. The data fetch mechanism may retrieve all appropriate data from data structure 502, using the wraparound mechanism as often as needed, and then provide the data for processing according to various examples herein.

In examples herein, a shuffle LUT may be used to fetch radar data from memory in a reconfigurable order. The shuffle LUT may be reconfigured if configuration of the radar data in memory changes, such as if a phase difference between radar transmitters changes. Examples herein may use a two-dimensional wrap mechanism to wrap around a data boundary in a data structure if the data is circular. These mechanisms provide faster processing times for radar data, because the radar data is not rearranged prior to processing. Radar applications such as target detection may be performed according to the examples herein. The techniques described herein may be performed with a MIMO FMCW radar system or in any other suitable radar system.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Circuits described herein are reconfigurable to include the replaced components to provide functionality at least partially similar to functionality available prior to the component replacement.

Unless otherwise stated, "about," "approximately," or "substantially" preceding a value means+/−10 percent of the stated value. Modifications are possible in the described examples, and other examples are possible within the scope of the claims.

What is claimed is:

1. A system comprising:
   a memory having a region configured to store radar data such that a first set of locations in the region is configured to store radar data of a first transmitter and a second set of locations in the region is configured to store radar data of a second transmitter, in which the second set of locations is non-contiguous with, and offset from, the first set of locations;
   a first counter configured to increment in a first instance to a set value on a first dimension of the region to identify locations in the region where radar data of the first transmitter are stored, and increment in a second instance to the set value on a second dimension of the region to identify locations in the region where radar data of the second transmitter are stored;
   a second counter configured to increment between the first instance of incrementing by the first counter and the second instance of incrementing by the first counter;
   a lookup table (LUT) configured to store indicators of locations in the region;
   a first multiplier configured to provide a first address based on a first count value of the first counter;
   a second multiplier configured to provide a second address based on a second count value of the second counter;

an adder coupled to the first and second multipliers and configured to provide a combined address based on the first and second addresses; and a wraparound mechanism coupled to the adder and configured to perform a wraparound operation when the combined address is greater than a last valid address in the region to generate a new combined address.

2. The system of claim 1, further comprising a processor configured to perform a transform operation on a subset of the radar data fetched from the memory based on the new combined address.

3. The system of claim 2, wherein the first count value includes a start index configured to indicate a location in the region from which to begin fetching radar data.

4. The system of claim 1, further comprising first and second phase shifters coupled to the first and second transmitters, respectively, wherein the first phase shifter is configured to apply a first phase shift to chirps of a first set of chirps to be transmitted, the second phase shifter is configured to apply a second phase shift to chirps of a second set of chirps to be transmitted, and the offset is based at least in part on a difference between the first and second phase shifts.

5. The system of claim 1, wherein the LUT is configured to store indicators of locations based on the offset.

6. The system of claim 1, wherein the radar data stored in the memory includes radar data received from a plurality of radar receivers.

7. A non-transitory processor-readable medium storing instructions that, when executed by one or more processors, cause a system that includes the one or more processors to:
store radar data in a region of a memory, wherein first radar data of a first transmitter of the system is stored in a first set of locations in the memory and second radar data of a second transmitter of the system is stored in a second set of locations in the memory, in which the second set of locations is non-contiguous with, and offset from, the first set of locations;
increment, in a first instance and using a first counter, a first count on a first dimension of the region starting at a first location in the memory up to a set value, thereafter incrementing, using a second counter, a count on a second dimension of the region, and incrementing, in a second instance and using the first counter, a second count on the first dimension starting at a second location in the region up to the set value;
retrieve the first radar data from the region using multiplier and adder circuitry, wherein a location of the first radar data in the region is selected from a lookup table (LUT) based on the first count;
retrieve from the region using the multiplier and adder circuitry, wherein a location of the second radar data in the region is selected from the LUT based on the second count; and
perform a transform operation on the retrieved first and second radar data.

8. The non-transitory processor-readable medium of claim 7, wherein the offset is based at least in part on a difference between (i) a first phase difference between chirps of a first set of chirps transmitted by the first transmitter and a (ii) second phase difference between chirps of a second set of chirps transmitted by the second transmitter.

9. The non-transitory processor-readable medium of claim 7, wherein the transform operation is a Fast Fourier Transform (FFT) operation.

10. The non-transitory processor-readable medium of claim 7, wherein a value in the LUT that indicates a location in the region is based on the offset.

11. The non-transitory processor-readable medium of claim 7, wherein the system further includes a first and second phase shifters coupled to the first and second transmitters, respectively, and the instructions, when executed by the one or more processors, further cause the first phase shifter to apply a first shift to a first set of chirps transmitted by the first transmitter and cause the second phase shifter apply a second phase shift to a second set of chirps transmitted by the second transmitter, the second phase shift being different than the first phase shift.

12. The non-transitory processor-readable medium of claim 7, wherein the instructions, when executed by the one or more processors, further cause the system to detect a target object in the first radar data and the second radar data.

13. The non-transitory processor-readable medium of claim 8, wherein the offset is a number of units in the second dimension.

14. A non-transitory processor-readable medium storing instructions that, when executed by one or more processors, cause a system that includes the one or more processors to:
store radar data in a region of a memory, wherein first radar data of a first transmitter of the system is stored in a first set of locations in the memory and radar data of a second transmitter of the system is stored in a second set of locations in the memory, in which the second set of locations is non-contiguous with, and offset from, the first set of locations;
increment, in a first instance and using a first counter, a first count on a first dimension of the region starting at a first location in the memory up to a set value, thereafter incrementing, using a second counter, a count on a second dimension of the region, and incrementing, in a second instance and using the first counter, a second count on the first dimension starting at a second location in the region up to the set value;
retrieve the first radar data from the region using multiplier and adder circuitry, wherein a location of the first radar data in the region is selected from a lookup table (LUT) based on the first count;
retrieve the second radar data from the region using the multiplier and adder circuitry and a wraparound mechanism when an address provided by the multiplier and adder circuitry indicates a location of the second radar data outside of the region, and wherein the second radar data is retrieved by wrapping around, using the wraparound mechanism, to a valid location in the region; and
perform a transform operation on the first radar data and the second radar data.

15. The non-transitory processor-readable medium of claim 14, wherein wrapping around to a valid location in the region includes subtracting a last valid address of the region from the location of the second radar data indicated by the LUT.

16. The non-transitory processor-readable medium of claim 14, wherein the instructions to increment, retrieve the first radar data, and retrieve the second radar data, when executed by the one or more processors, further cause the system to:
increment a start index for the region; and
retrieve the first radar data and the second radar data from the region based on the LUT and the incremented start index.

17. The non-transitory processor-readable medium of claim 14, wherein the instruction to retrieve the second radar data, when executed by the one or more processors, further cause the system to combine a second dimension and a third dimension that indicates the location of the second radar data, and then retrieve the second radar data by wrapping around to the valid location in the region.

18. The non-transitory processor-readable medium of claim 14, wherein the offset is based at least in part on a difference between a phase difference between chirps of the first transmitter and a phase difference between chirps of the second transmitter.

19. The non-transitory processor-readable medium of claim 14, wherein the instruction to retrieve the second radar data, when executed by the one or more processors, further cause the system to combine a first dimension with either a second dimension or a third dimension that indicates the location of the second radar data, and then retrieve the second radar data by wrapping around to the valid location in the region.

20. The non-transitory processor-readable medium of claim 14, wherein the offset is a Doppler-based offset.

\* \* \* \* \*